US011958301B2

(12) United States Patent
Murase et al.

(10) Patent No.: US 11,958,301 B2
(45) Date of Patent: Apr. 16, 2024

(54) PRINTING APPARATUS, CONTROL METHOD, AND STORAGE MEDIUM

(71) Applicant: CANON KABUSHIKI KAISHA, Tokyo (JP)

(72) Inventors: Takeshi Murase, Kanagawa (JP); Kazuhiko Sato, Tokyo (JP); Taku Yokozawa, Kanagawa (JP); Noboru Kunimine, Tokyo (JP); Hiroshi Taira, Tokyo (JP); Hiroshi Kawafuji, Kanagawa (JP); Sae Mogi, Kanagawa (JP); Akiko Aichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/355,571

(22) Filed: Jun. 23, 2021

(65) Prior Publication Data

US 2021/0402813 A1 Dec. 30, 2021

(30) Foreign Application Priority Data

Jun. 24, 2020 (JP) ................................ 2020-108999

(51) Int. Cl.
*B41J 25/00* (2006.01)
*B41J 2/045* (2006.01)
*B41J 29/393* (2006.01)

(52) U.S. Cl.
CPC ......... *B41J 25/006* (2013.01); *B41J 2/04563* (2013.01); *B41J 29/393* (2013.01)

(58) Field of Classification Search
CPC ........ B41J 25/006; B41J 29/38; B41J 29/393; B41J 2/0458; B41J 2/04563;
(Continued)

(56) References Cited

U.S. PATENT DOCUMENTS 5,477,246 A 12/1995 Hirabayashi et al.
6,297,841 B1 * 10/2001 Takeda .................... B41J 2/365 347/186

(Continued)

FOREIGN PATENT DOCUMENTS

JP 05-31886 A 2/1993
JP 2007-276360 A 10/2007

(Continued)

OTHER PUBLICATIONS

U.S. Appl. No. 17/201,034, Hiroshi Kawafuji, Kazuhiko Sato, Kazuo Suzuki, Takeshi Murase, Hiroshi Taira, Tomoki Yamamuro, Sae Mogi, Masaki Nitta, filed Mar. 15, 2021.

(Continued)

*Primary Examiner* — Jannelle M Lebron
(74) *Attorney, Agent, or Firm* — Venable LLP

(57) ABSTRACT

A printing apparatus includes a printing unit configured to print an image on a print medium, an acquiring unit configured to acquire temperature information of the printing unit, and a control unit configured to control the printing unit so as to start relative scanning in a case where a temperature that is indicated by the temperature information has reached a print permission temperature. The print permission temperature in a first print mode whose speed at a time of a constant speed in relative scanning is a first speed is a first temperature. The print permission temperature in a second print mode whose speed at the time of the constant speed is a second speed that is faster than the first speed is a second temperature that is lower than the first temperature.

19 Claims, 11 Drawing Sheets

(58) Field of Classification Search
CPC .... B41J 2/04528; B41J 2/04551; B41J 2/195; B41J 19/202; B41J 2/14153; B41J 2/0454
See application file for complete search history.

(56) References Cited

U.S. PATENT DOCUMENTS

| | | | |
|---|---|---|---|
| 7,703,872 | B2 | 4/2010 | Nishikori et al. |
| 7,782,350 | B2 | 8/2010 | Tanaka et al. |
| 8,038,249 | B2 | 10/2011 | Hayashi et al. |
| 8,628,163 | B2 | 1/2014 | Kanematsu et al. |
| 8,740,333 | B2 | 6/2014 | Teshigawara et al. |
| 8,783,832 | B2 | 7/2014 | Oonuki et al. |
| 8,888,223 | B2 | 11/2014 | Oonuki et al. |
| 8,931,875 | B2 | 1/2015 | Kosaka et al. |
| 8,950,843 | B2 | 2/2015 | Oikawa et al. |
| 9,138,991 | B2 | 9/2015 | Murase et al. |
| 9,259,921 | B2 | 2/2016 | Shirakawa et al. |
| 10,668,717 | B2 | 6/2020 | Azuma et al. |
| 2006/0284915 | A1 | 12/2006 | Han |
| 2007/0236523 | A1 * | 10/2007 | Nishikori ............. B41J 2/04598 347/14 |
| 2010/0315451 | A1 * | 12/2010 | Bansyo ................ B41J 2/04561 347/6 |

FOREIGN PATENT DOCUMENTS

| | | | |
|---|---|---|---|
| JP | 2007-290355 | A | 11/2007 |
| JP | 2008-168625 | A | 7/2008 |
| JP | 2015-134501 | A | 7/2015 |
| JP | 2016-002738 | A | 1/2016 |

OTHER PUBLICATIONS

Office Action dated Mar. 1, 2024 in Japanese Patent Application No. 2020-108999.

* cited by examiner

FIG. 6A

| PAPER TYPE | PRINT QUALITY | NUMBER OF DIVISION OF PASS | CARRIAGE SPEED | TEMPERATURE ADJUSTMENT MODE |
|---|---|---|---|---|
| PLAIN PAPER | GOOD | 4 | 40ips | A |
| PLAIN PAPER | NORMAL | 1 | 60ips | B |
| PLAIN PAPER | HIGH SPEED | 1 | 80ips | C |
| PHOTO PAPER | GOOD | 12 | 20ips | D |
| PHOTO PAPER | HIGH SPEED | 8 | 40ips | A |

FIG. 6B

| TEMPERATURE ADJUSTMENT MODE | PRINT PERMISSION TEMPERATURE (°C) | HEATING FREQUENCY (kHz) |
|---|---|---|
| A | 50 | 5 |
| B | 45 | 10 |
| C | 40 | 10 |
| D | 53 | 5 |

FIG. 9

| | | ENVIRONMENTAL TEMPERATURE | | | |
|---|---|---|---|---|---|
| | | 5 ~ 15°C | 15 ~ 25°C | 25 ~ 35°C | 35°C ~ |
| ENVIRON-MENTAL HUMIDITY | 0 ~ 30% | +10°C | +3°C | 0°C | +3°C |
| | 30 ~ 60% | +5°C | 0°C | 0°C | 0°C |
| | 60% ~ | +3°C | 0°C | 0°C | -3°C |

PRINTING APPARATUS, CONTROL METHOD, AND STORAGE MEDIUM

BACKGROUND OF THE INVENTION

Field of the Invention

The present invention relates to a printing technique.

Description of the Related Art

In printing apparatuses that discharge ink, a technique in which ink heat retention control is performed in order to prevent change in a viscosity of ink that is to be discharged and the like and thereby perform ink discharge in a stable manner is proposed. For example, in a print head that comprises a print element that discharges ink using thermal energy, control in which the print head (i.e., ink) is increased in temperature by applying to the print element a driving pulse (short driving pulse) that does not discharge ink is known. Also, control in which the print head (i.e., ink) is increased in temperature by arranging in the print head a sub heater for heat retention that is different from the print element is known. Japanese Patent Laid-Open No. H5-31886 discloses a technique in which a heating element that is different from a print element is included and the temperature of temperature control is changed in accordance with a difference in print modes such as a type of image data and the number of divisions of a pass at the time of printing.

In printing apparatuses that perform temperature control of a print head, printing is started after temperature adjustment of the print head to a predetermined temperature is awaited and that the temperature has reached the predetermined temperature is confirmed. There is a problem that throughput decreases due to a waiting period for temperature adjustment.

SUMMARY OF THE INVENTION

The present invention provides a technique for improving a waiting period for temperature adjustment.

According to an aspect of the present invention, there is provided a printing apparatus comprising: a printing unit configured to print an image on a print medium by application of a printing material during relative scanning of the print medium; an acquiring unit configured to acquire temperature information of the printing unit; and a control unit configured to control the printing unit so as to start relative scanning in a case where a temperature that is indicated by the acquired temperature information has reached a print permission temperature, wherein the print permission temperature in a first print mode whose speed at a time of a constant speed in relative scanning is a first speed is a first temperature, and the print permission temperature in a second print mode whose speed at the time of the constant speed is a second speed that is faster than the first speed is a second temperature that is lower than the first temperature.

Further features of the present invention will become apparent from the following description of exemplary embodiments (with reference to the attached drawings).

BRIEF DESCRIPTION OF THE DRAWINGS

FIG. 6A is a view illustrating an example of types of print modes.

FIG. 6B is a view illustrating an example of types of temperature adjustment modes.

FIG. 9 is a view illustrating an example of correction values of a print permission temperature by environmental temperature and environmental humidity.

DESCRIPTION OF THE EMBODIMENTS

Figure 1A:
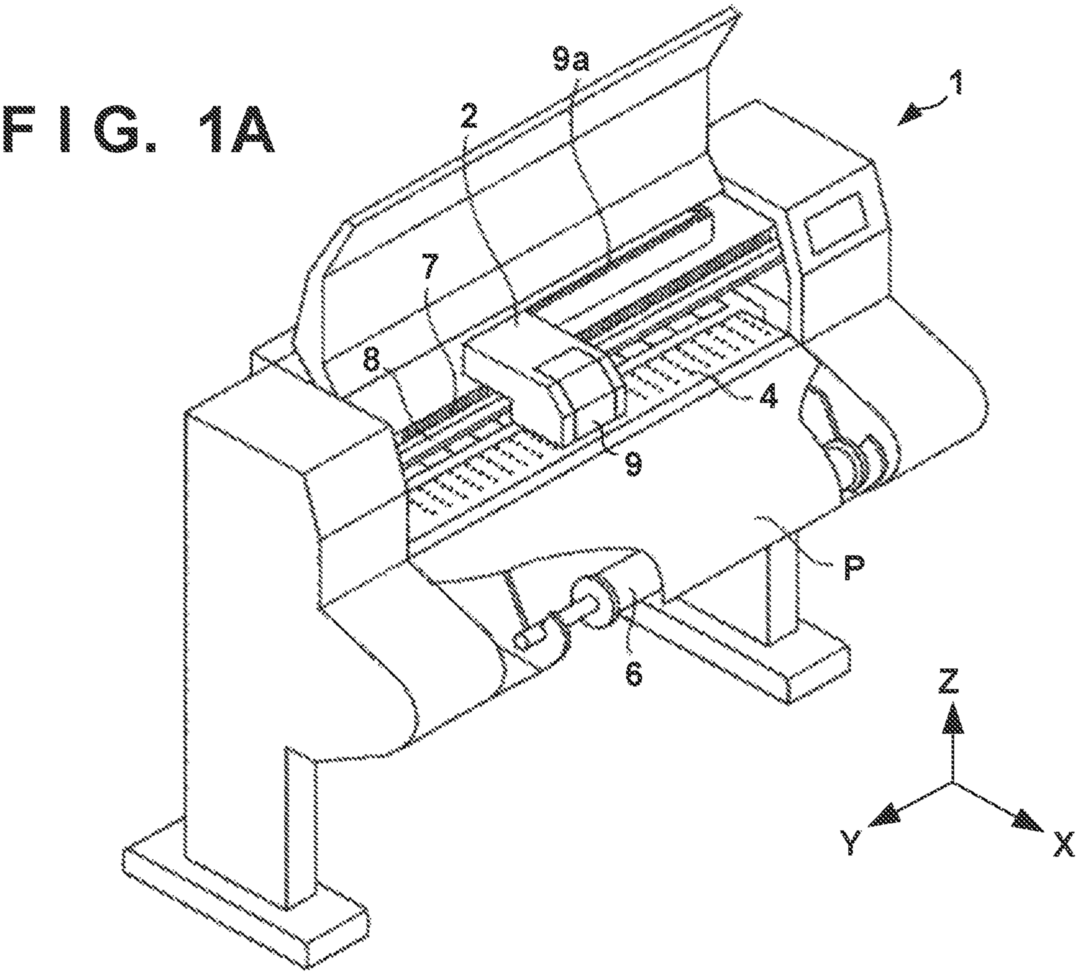
FIG. 1A is a perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are used to identify the same or similar configurations, and redundant description thereof is omitted. Furthermore, in the attached drawings, the same reference numerals are given to the same or similar configurations, and redundant description thereof is omitted.

First Embodiment

<Printing Apparatus Overview>

Figure 1B:
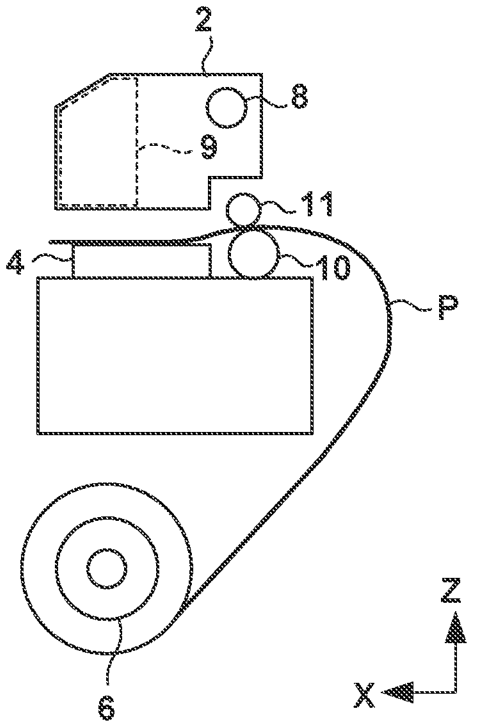
FIG. 1B is a schematic diagram illustrating a print medium conveyance mechanism in the printing apparatus of FIG. 1A.

FIG. 1A is a perspective view of a printing apparatus 1 in the present embodiment and FIG. 1B is a schematic diagram illustrating a conveyance mechanism of a print medium P in the printing apparatus 1. The printing apparatus 1 is a serial-type inkjet printing apparatus. In the figure, arrows X, Y, and Z are respectively a direction of conveyance of the print medium P (sub-scanning direction), a direction of movement of a carriage 2 (main scanning direction), and an up-and-down direction. The main scanning direction and the sub scanning direction intersect and are orthogonal in a case of the present embodiment.

Note that "printing" encompasses not only cases where meaningful information such as text and figures are formed but also cases where broadly, an image, a design, a pattern, and the like—irrespective of whether they are meaningful or meaningless—are formed on a print medium or processing of a medium is performed, and it does not matter whether or not what is formed is a manifestation that can be perceived through vision by a person. In addition, although in this embodiment, sheet-like paper is assumed as a "print medium", cloth, plastic film, and the like may be used as print media.

The printing apparatus 1 comprises a conveyance roller 10 that conveys the print medium P and a pinch roller 11 which is pressed against the conveyance roller 10. The conveyance roller 10 and the pinch roller 11 hold the print medium P therebetween and, by rotation thereof, feed the print medium P in an X direction onto a platen 4 from a spool 6 around which the print medium P is wound into a rolled shape.

Figure 2A:
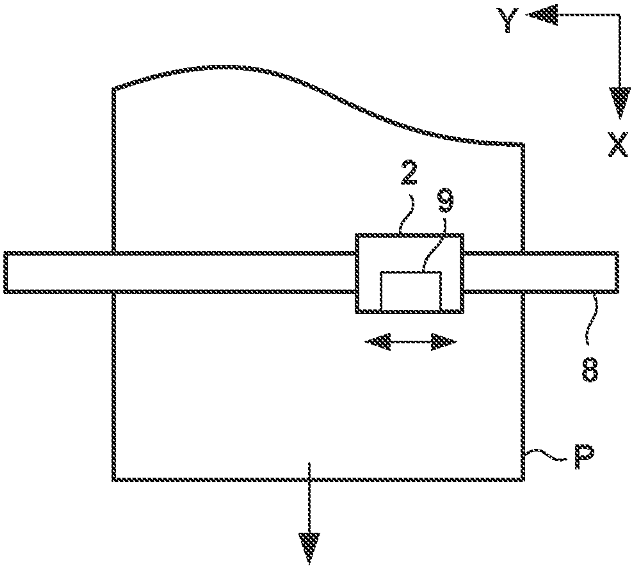
FIG. 2A is a view of a carriage seen from above.

The carriage 2 incorporates a print head 9 and is arranged so as to be capable of moving in both directions of a Y direction above the platen 4 in accordance with guidance of a guide shaft 8 that is arranged to extend in the Y direction. FIG. 2A is a view of the carriage 2 seen from above. The carriage 2 can move between a print position and a print standby position (home position) in the Y direction. The print position is a position at which the print head 9 exists within an image print region on the print medium P, and the print standby position is a position at which the print head 9 is away in the Y direction from the print medium P. A position of the carriage 2 is specified from a position signal that an encoder sensor (not shown) that is arranged in the carriage 2 outputs by reading an encoder 7 that is arranged to extend in the Y direction.

In a process of movement of the carriage 2, printing is performed by discharging ink as a printing material from the print head 9 at a timing that is based on the position signal. Discharging ink from the print head 9 while moving the carriage 2 is sometimes called print scanning. The print head 9 can print an image in a fixed band width in the X direction which corresponds to a nozzle arrangement range in which nozzles that discharge ink are arranged. In print scanning, the carriage 2 moves 40 inches per second and times an ink discharge operation to achieve 600 dpi (dot/inch), for example. In the present embodiment, print scanning is performed in a forward movement of the carriage 2. However, print scanning may be performed in each of a forward movement and a backward movement of the carriage 2. An image will be printed onto the print medium P by alternately repeating print scanning and conveyance per predetermined unit of the print medium P.

Note that it is also possible to configure one conveyance amount of the print medium P to be a band width, or to be less than the band width. In other words, it is also possible to not perform conveyance of the print medium P by the band width for each print scan and perform conveyance of the print medium P after a plurality of times of print scanning is performed. Also, it is possible to perform so-called multipass printing. In multipass printing, print data which has been thinned by predetermined masking is printed for each print scan. Then, a plurality of print scans and conveyances of the print medium P are performed changing the nozzles that are involved in the printing in relation to one print region.

In the print head 9, a flexible wiring substrate 9*a* for supplying control signals such as a print signal for discharge driving and a temperature adjustment signal is attached. The other end of the flexible wiring substrate 9*a* is connected to a control circuit that will be described later.

<Print Head>

Figure 2B:
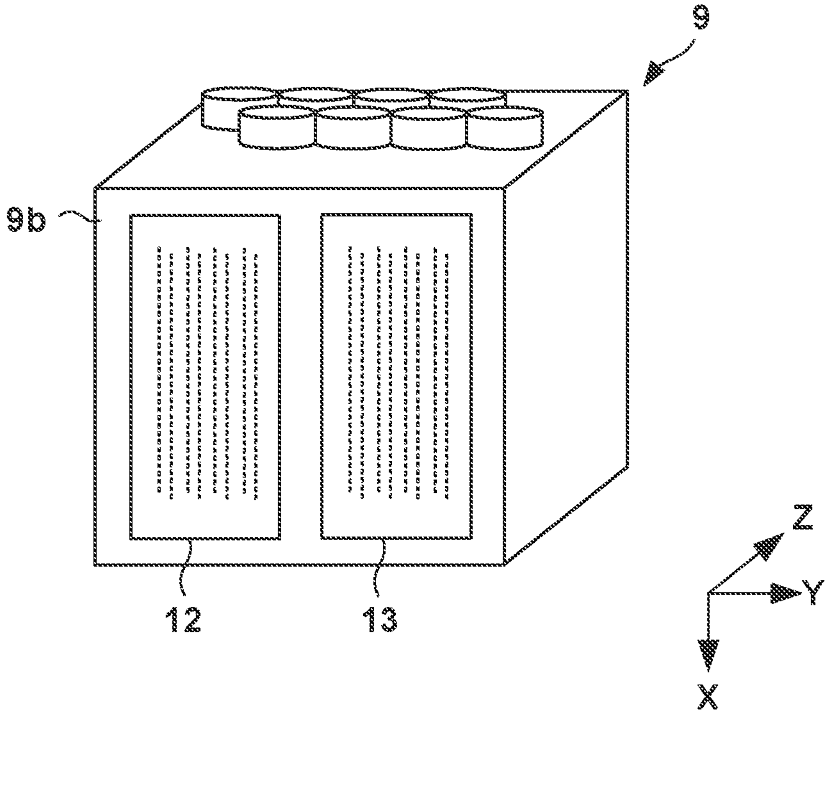
FIG. 2B is a schematic diagram of a print head seen from an ink discharge surface side.
Figure 3A:
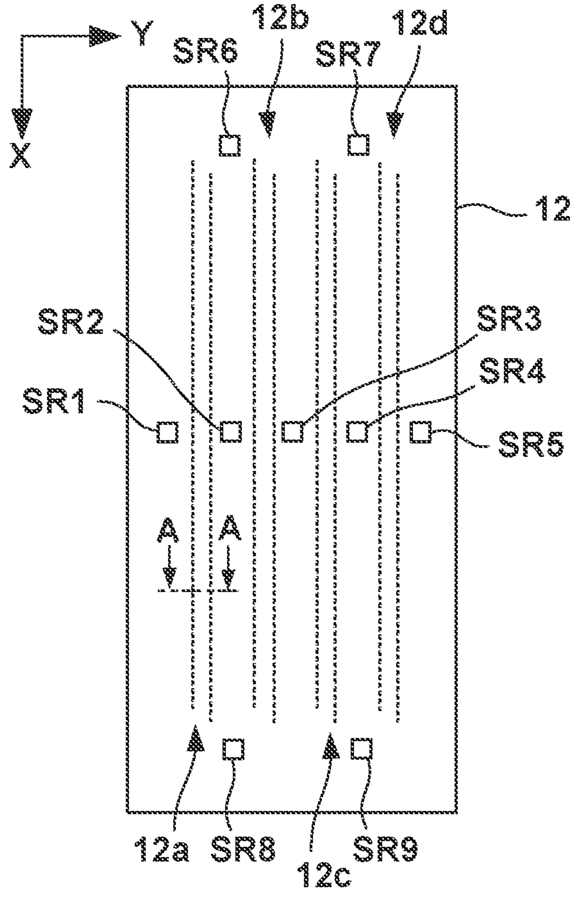
FIG. 3A is a magnified view of a discharge element substrate.

FIG. 2B is a schematic diagram of the print head 9 seen from an ink discharge surface 9*a* side. The ink discharge surface 9*a* is a surface that faces the platen 4 and has discharge element substrates 12 and 13 that are spaced apart in the Y direction. FIG. 3A is a magnified view of the discharge element substrate 12.

The discharge element substrate 12 has print element arrays 12*a* to 12*d*. Ink that the print element arrays 12*a* to 12*d* discharge is, for example, black ink for the print element array 12*a*, grey ink for the print element array 12*b*, light grey ink for the print element array 12*c*, and light cyan ink for the print element array 12*d*. Each of the print element arrays 12*a* to 12*d* has two columns of nozzles that are spaced apart in the Y direction and each column of nozzles has a group of a plurality of nozzles that are arranged in the X direction. In a case of the present embodiment, the two columns of nozzles are shifted by 1200 dpi in the X direction and one column of nozzles has 768 nozzles.

Figure 3B:
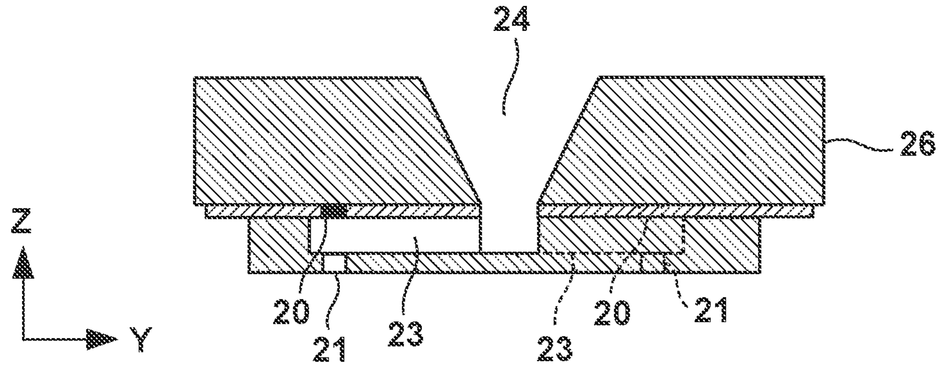
FIG. 3B is a cross-sectional view along an A-A line of FIG. 3A.

FIG. 3B is a cross-sectional view along an A-A line of FIG. 3A. The discharge element substrate 12 has a support substrate 26, a print element 20, and an orifice plate 22. In the orifice plate 22, a discharging port 21*a* is formed. Between the support substrate 26 and the orifice plate 22, a flow passage 23 for each nozzle is formed. The print element 20 of the present embodiment is a heating element that discharges ink from the discharging port 21*a* using thermal energy and is an electro-thermal conversion element that generates heat upon supply of an electrical signal. The print element 20 is arranged so as to face a nozzle 21*a* and a protective film and the like are formed on the surface thereof. Ink is supplied to the flow passage 23 from a common liquid chamber 24 and the ink is discharged from the discharging port 21*a* by bubbling of the ink by heat generation of the print element 20.

As illustrated in FIG. 3A, a plurality of sensors SR1 to SR9 that detect temperature of the print head 9 are arranged in the discharge element substrate 12. The sensors SR1 to SR9 are, for example, diodes. The sensors SR1 to SR5 are arranged to be spaced apart in the Y direction at a central portion in the X direction of the discharge element substrate 12. The sensors SR6 and SR7 are arranged to be spaced apart in the Y direction at one end in the X direction of the discharge element substrate 12, and the sensors SR8 and SR9 are arranged to be spaced apart in the Y direction at the other end in the X direction of the discharge element substrate 12. In a case where the sensors SR1 to SR9 are collectively referred to or in a case where they are not distinguished, they are denoted as sensors SR.

The discharge element substrate 13 is of the same configuration as the discharge element substrate 12; however, a type of ink that is to be discharged is different. The discharge element substrate 13 discharges, for example, cyan ink, light magenta ink, magenta ink, and yellow ink.

<Control Circuit>

Figure 4:
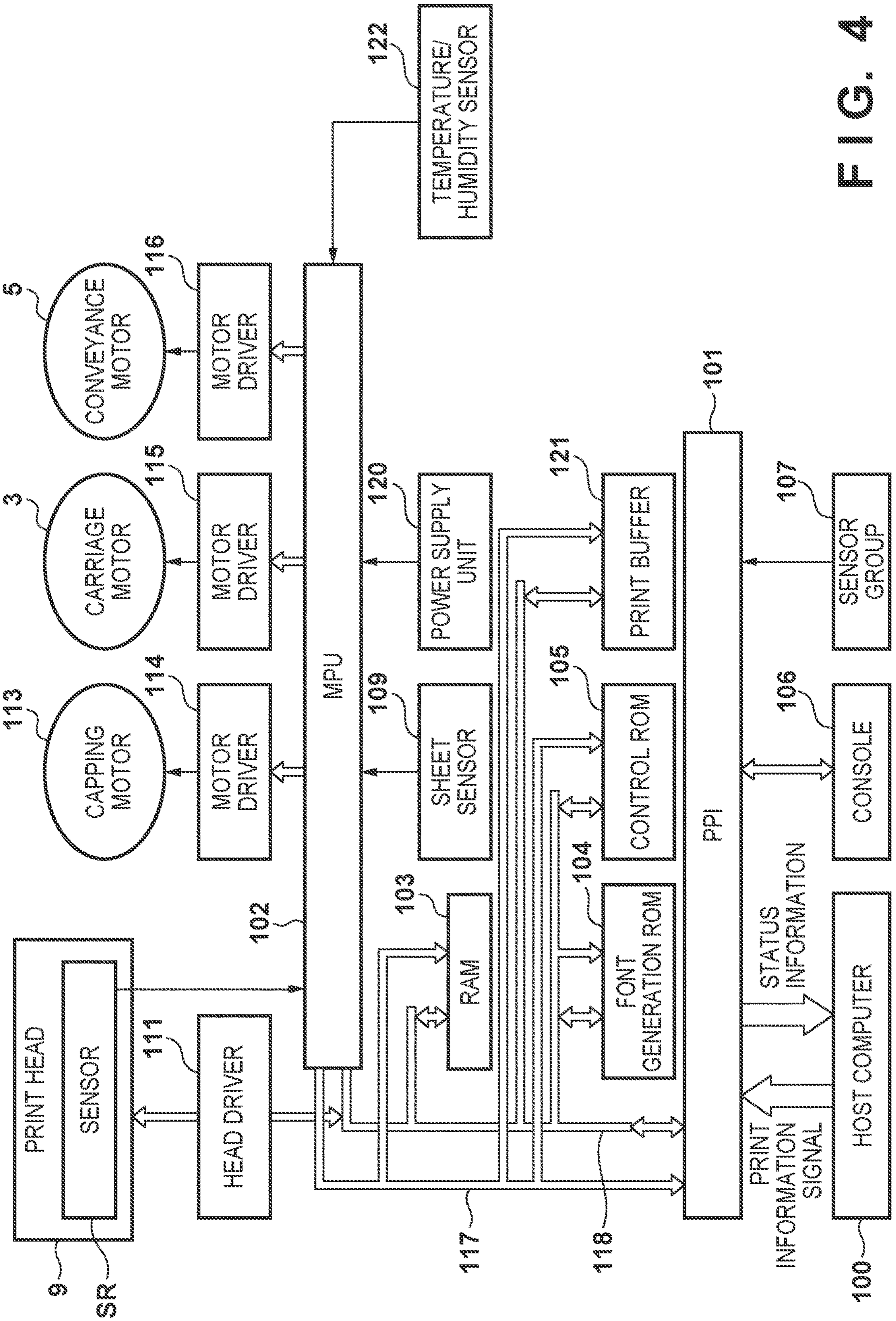
FIG. 4 is a block diagram of a control circuit.

FIG. 4 is a block diagram of a control circuit of the printing apparatus. In FIG. 4, a programmable peripheral interface (hereinafter, PPI) 101 receives and transfers to an MPU 102 command signals (commands) and print information signals, which include print data, that are sent from a host computer 100. The PPI 101 also outputs status information of the printing apparatus 1 as necessary to the host computer 100.

A console 106 has a setting input unit on which a user performs various settings, a display unit that displays a message to the user, and the like, and the console 106 performs input/output of information to and from the MPU 102 via the PPI 101. A sensor group 107 includes a home position sensor that detects that the carriage 2 is at the print standby position and the like, and the MPU 102 acquires via the PPI 101 a detection result of the sensor group 107.

The MPU (micro processing unit) 102 can input/output data to and from each device via an address bus 117 and a data bus 118 and controls each unit of the printing apparatus 1 in accordance with a control program that is stored in a control ROM 105. A RAM 103 is used as a work area of the MPU 102 and also temporarily stores various kinds of data. A print buffer 121 is for storing print data that has been deployed in the RAM 103 and the like and has a storage capacity for printing a plurality of rows. In the control ROM 105, it is possible to store data that corresponds to data that is to be used in a process of control, which will be described later, and the like in addition to the above control program.

Motor drivers 114 to 116 are driving circuits that drive a capping motor 113, a carriage motor 3, and a conveyance motor 5, respectively, in accordance with control of the MPU 102. The capping motor 113 is a driving source of a mechanism that performs capping of the print head 9 at the print standby position. The conveyance motor 5 is a driving source of a mechanism that rotates the conveyance roller 10.

The carriage motor 3 is a driving source of a mechanism that causes the carriage 2 to move. For delivery of driving force to the carriage 2 from the carriage motor 3, it is possible to use a belt transmission mechanism that uses an endless carriage belt that travels in the X direction. As another mechanism, configuration may be a mechanism that comprises a lead screw that is rotatably driven by driving of the carriage motor 3 and is extended in the X direction and an engagement portion that is arranged in the carriage 2 and engages with a groove of the lead screw, for example.

A sheet sensor 109 detects whether or not the print medium P has been conveyed to a position at which printing by the print head 9 is possible. A driver 111 is a driving circuit for driving a print element of the print head 9. A temperature/humidity sensor 122 includes a peripheral temperature detection sensor that detects the temperature around the printing apparatus 1 and a peripheral humidity detection sensor that detects humidity around the printing apparatus 1 and detects environmental temperature and environmental humidity in an installation environment of the printing apparatus 1. The temperature/humidity sensor 122 may be arranged near the print head 9 or may be arranged on the outside of the printing apparatus 1. A power supply unit 124 supplies power to each unit of the printing apparatus 1.

Information such as a print mode designation in addition to print data is transmitted from the host computer 100 to the MPU 102. The print mode specifies a print condition. The print condition includes, for example, a type of print medium, a size of the medium, print quality, and the like. The type of print medium is, for example, a type such as plain paper, an OHP sheet, or glossy paper as well as a special type of print medium such as a transfer film, thick paper, and banner paper. The size of medium is, for example, an A0 size, an A1 size, an A2 size, a B0 size, a B1 size, a B2 size, or the like. The print quality is, for example, a draft, high quality, medium quality, emphasis of a particular color, classification of monochrome/color, and the like. The print condition can also include, for example, a number of printing passes for when performing multipass printing, which has been described above; information for deciding an ink application amount per unit area of a print medium, a printing direction, and the like; and a type of mask for data thinning that is applied when multipass printing is performed.

<Example of Control>

Figure 5:
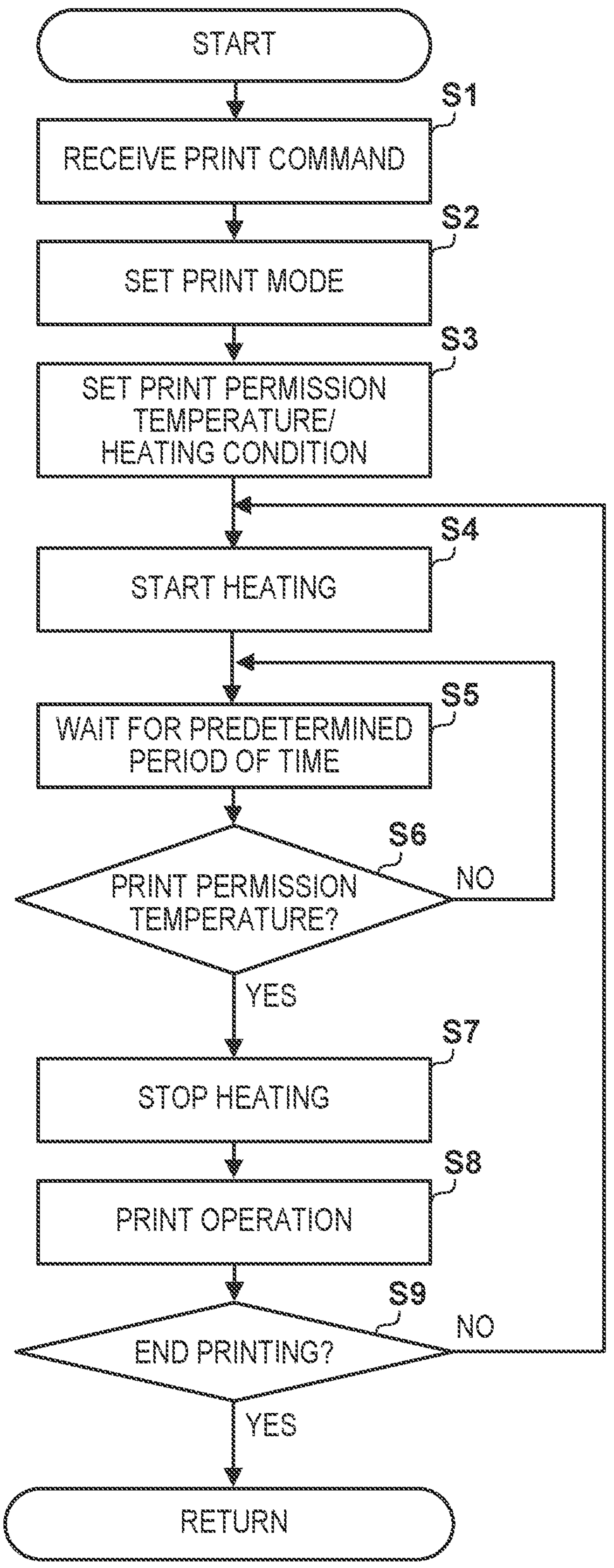
FIG. 5 is a flowchart illustrating an example of control of the printing apparatus of FIG. 1A.

An example of control of the printing apparatus 1 by the control circuit will be described. FIG. 5 is a flowchart illustrating an example of processing that the MPU 102 executes. This example of control is an example of processing that is executed in a case where the user performs, on the host computer 100, setting of a print mode or selection of a file that is to be printed and transmits a print command to the printing apparatus 1. This example of control is an example in which temperature control (heat retention control) of the print head 9 that corresponds to a print mode that the user has selected from among a plurality of print modes such as a paper type and print quality is performed. By maintaining the print head 9 at an appropriate temperature, it is possible to prevent change in the viscosity of ink that is to be discharged and the like and perform ink discharge in a stable manner.

In the present embodiment, a print operation of the print head 9 is started under a condition that the print head 9 has reached a preset print permission temperature for each print scan. The print operation is made to wait until the print head 9 reaches the print permission temperature; accordingly, if the time it takes for the temperature to increase is long, throughput will decrease. The print head 9 gradually decreases in temperature during print scanning. If the time it takes for one print scan is short, a decrease in temperature is small. Accordingly, in a case where a period of print scanning is short, it is possible to perform ink discharge in a stable manner even if the print permission temperature is made to be lower in comparison to a case where the period of print scanning is long. Also, if the print permission temperature is low, the time that is required for the print head 9 to increase in temperature will also be short.

Accordingly, in the present embodiment, the print permission temperature is changed in accordance with the length of a period of print scanning. By this, it is possible to improve a waiting period for temperature adjustment and increase throughput while performing ink discharge in a stable manner. The length of a period of print scanning is distinguished using a relative speed of the print head 9 and the print medium P as a reference and is distinguished using, in particular, a movement speed of the carriage 2 as a reference. The relative speed (i.e., the movement speed of the carriage 2) here is a speed at the time of a print operation in which a print operation is performed at a constant speed after carriage movement is started and accelerated.

With reference to FIG. 5, in step S1, a print command is received from the host computer 100. In step S2, the print command that is received in step S1 is analyzed and a print mode is set.

FIG. 6A illustrates an example of types of print modes. In the example in the figure, five types of print modes are exemplified and "paper type", "print quality", "number of divisions of pass", "carriage speed", and "temperature adjustment mode" are specified, respectively. "Paper type" is a type of print medium P. In the example in the figure, two types, which are plain paper and photo paper, are specified. "Print quality" is a type of quality of an image to be printed. In the example in the figure, three types, which are good, normal, and high speed, are specified. "Number of divisions of pass" is a number of print scans that are required in order to print one line of an image. In the example in the figure, four types, which are 1 time, 4 times, 8 times, and 12 times, are specified. Four times, 8 times, and 12 times indicate multipass printing. "Carriage speed" is a movement speed in the Y direction of the carriage 2 in print scanning. "Temperature adjustment mode" is a control condition for temperature control of the print head 9. In the example in the figure, four types from A to D are specified.

Accordingly, the print mode specifies internal parameters that define detailed control for performing printing. FIG. 6A is an example, and it is possible to define, as a print mode, various kinds of information such as an image processing resolution, a type of error diffusion, and a type of ink that is to be used in various formats.

FIG. 5 is returned to, and in step S3, a print permission temperature and a heating condition are set. The print permission temperature is specified for each type of print mode (type of temperature adjustment mode). For example, in a case where the print mode that is set in step S2 is a print mode whose paper type is plain paper and print quality is normal, a temperature adjustment mode B is referenced and a print permission temperature is set.

FIG. 6B exemplifies each of the content of temperature adjustment modes A to D. In the example in the figure, "print permission temperature" and "heating frequency" are specified. In a case of the temperature adjustment mode B, "print permission temperature" is 45° C. "Heating frequency" specifies a frequency of a driving signal that is to be applied to a heating element arranged in the print head 9 when increasing the print head 9 in temperature. In a case of the temperature adjustment mode B, "heating frequency" is 10 kHz as a heating condition. In a case of the present embodiment, the print element 20 is used as a heating element. The print element 20 is heated by applying a short driving pulse that does not discharge ink, and by this, the print head 9 is increased in temperature. The information of temperature adjustment modes can be stored in a storage device such as the control ROM 105, for example.

Note that the temperature adjustment modes specify "print permission temperature" and "heating frequency" in the present embodiment but can also specify other items. For example, temperature adjustment modes may specify items such as the length of a pulse of a short driving pulse and a nozzle that is to be used for an increase in temperature.

FIG. 5 is returned to, and in step S4, heating of the print head 9 is started under the heating condition that is set in step S3. Specifically, the print element 20 of the print head 9 is heated by supplying a short driving pulse. The carriage 2 is positioned at the print standby position and the print head 9 is on print standby. As described above, in the present embodiment, temperature control of the print head 9 is performed using the print element 20. It is also possible to perform temperature control of the print head 9 in parallel during a print operation; however, control becomes complicated. In the present embodiment, it is possible to avoid control from becoming complicated by performing temperature control during print standby of the print head 9 and raising the temperature of the print head 9 to the print permission temperature.

In step S5, a wait of a predetermined waiting period (e.g., 100 ms) is performed. An increase in the temperature of the print head 9 is awaited. In step S6, detection results of the sensors SR are acquired as temperature information and it is determined whether or not the print head 9 has reached the print permission temperature that is set in step S3. In a case where the print permission temperature has been reached, the processing advances to step S7, and in a case where the print permission temperature has not been reached, the processing returns to step S5.

Here, in the present embodiment, nine sensors SR1 to SR9 are arranged in the discharge element substrate 12 as sensors that detect the temperature of the print head 9. The same is true for the discharge element substrate 13. In a case of such a configuration, it is possible to employ various methods as a method of comparing each detection result and the print permission temperature. For example, an average value of temperatures detected by all the sensors SR may be considered as the temperature of the print head 9. Also, a sensor SR that is to be compared with may be selected by a relation to a nozzle that is to be used, or detection results may be weighted. For example, there are a method in which only the detection results of sensors SR that exist near the columns of nozzles that discharge black ink are used in a case where an image that is to be printed is a monochrome image and a method in which the detection results of sensors SR that exist near the rows of nozzles that discharge black ink are weighted.

In step S7, the heating of the print head 9 that is started in step S4 is stopped. Specifically, supplying of the short driving pulse in relation to the print element 20 of the print head 9 is stopped. In step S8, a print operation is executed. Specifically, print scanning is performed once. Note that there are cases where print data is generated in advance in order to perform printing; however, configuration may be taken such that print data is generated by performing data processing while performing printing. In step S9, it is determined whether print data for the next print scanning remains and if print data for the next print scanning does not remain, printing is ended. If print data for the next print scanning does remain, the processing is advanced to step S4, the same processing is repeated, and an image is printed by a plurality of print scans.

Next, an example of increasing throughput by changing the print permission temperature will be described. Here, among the print modes of FIG. 6A, a print mode (temperature adjustment mode B) whose paper type is plain paper and print quality is normal and a print mode (temperature adjustment mode C) whose paper type is plain paper and print quality is high speed will be comparison targets. For these print modes, the type of print medium P and the number of divisions of a pass are the same and only the movement speed of the carriage 2 is different. The speed is relatively slow (60 ips) in the print mode whose paper type is plain paper and print quality is normal, and the speed is relatively fast (80 ips) in the print mode whose paper type is plain paper and print quality is high speed. Conversely, the print permission temperature is relatively high (temperature adjustment mode B: 45° C.) in the print mode whose paper type is plain paper and print quality is normal and the print permission temperature is relatively low (temperature adjustment mode C: 40° C.) in the print mode whose paper type is plain paper and print quality is high speed.

Figure 7A:
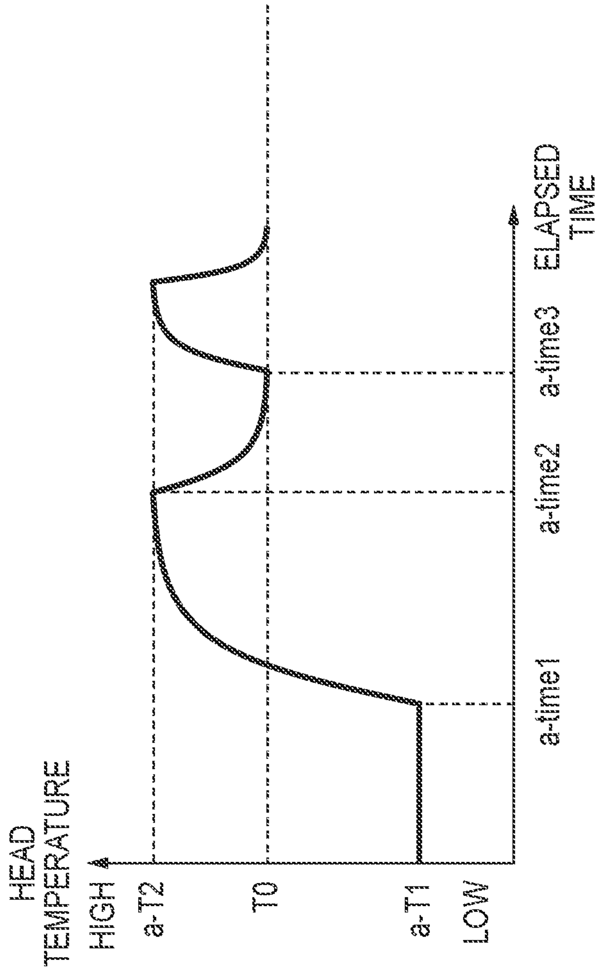
FIGS. 7A and 7B are views illustrating an example of change in the temperature of a print head in different print modes.
Figure 7B:
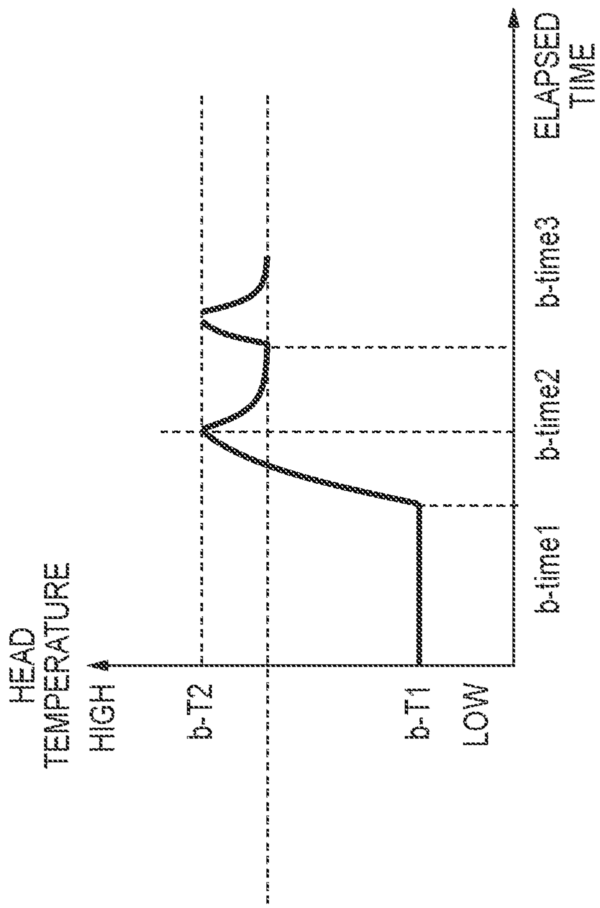

FIG. 7A and FIG. 7B illustrate an example of a change in the temperature of the print head 9. FIG. 7A illustrates a case where a print operation is executed in a print mode whose paper type is plain paper and print quality is normal and FIG. 7B illustrates a case where a print operation is executed in a print mode whose paper type is plain paper and print quality is high speed. In the graphs in the figures, the horizontal axes are elapsed time and the vertical axes are the temperature of the print head.

a-T1 and b-T1 on the vertical axes indicate the temperatures of the print head at the time of starting printing and a-T2 and b-T2 indicate the print permission temperatures (45° C. and 40° C.). a-Time1 and b-Time1 on horizontal axes indicate heating start timings of the print head 9 before initial print scanning. a-Time2 and b-Time2 indicate timings at which the temperature of the print head 9 has reached the print permission temperature and printing is started. a-Time3 and b-Time3 indicate timings at which the initial print scanning is ended.

In the example of FIG. 7A and FIG. 7B, due to a difference in the settings of the print permission temperature, there is a difference in the temperatures of the print head 9 at a-Time2 and b-Time2 at which printing is started. The temperature of the print head 9 is higher in the example of FIG. 7A. The temperature of the print head 9 decreases during print scanning (between a-Time2 and a-Time3 and between b-Time2 and b-Time3). This phenomenon of a decrease in temperature is seen in, for example, a case where a document of only monochrome text is printed. The frequency at which ink is discharged is low; accordingly, the temperature of the print head 9 decreases despite printing being in progress.

Also, the carriage speed in a case of FIG. 7A is slower than FIG. 7B; in other words, it takes more time to perform one print scan; accordingly, the temperature of the print head 9 is the same at T0 at the end of one print scan (a-Time3, b-Time3). There may be a difference in the print permission temperatures so long as the temperature T0 is greater than the minimum temperature that is necessary for discharging ink in a stable manner.

In other words, to discuss temperature control that is necessary for stable discharge, in a case where there is a nozzle that does not discharge ink during one print scan, moisture evaporates from a droplet at the surface of that nozzle and ink viscosity rises locally. Accordingly, in view of both moisture evaporation and a decrease in head temperature, it becomes key to maintain the print head 9 at at least the minimum temperature that is necessary for discharge at which stable discharge is achieved even if the temperature decreases during one print scan.

If the movement speed of the carriage 2 is different, the amount of decrease in temperature of the print head 9 in one print scan will be different. Accordingly, it is necessary to increase the print permission temperature in a print mode in which the amount of decrease in temperature is expected to be large in order to maintain the print head 9 to be at least the minimum temperature that is necessary for discharge; however, in a print mode in which the amount of decrease in temperature is small, the print permission temperature can be decreased. If the print permission temperature is low, it is possible to shorten the waiting period for an increase in temperature as illustrated in FIG. 7B and it is possible to contribute to reduction of a waiting period for a print operation. As a result of that, throughput can be increased.

Second Embodiment

Figure 8:
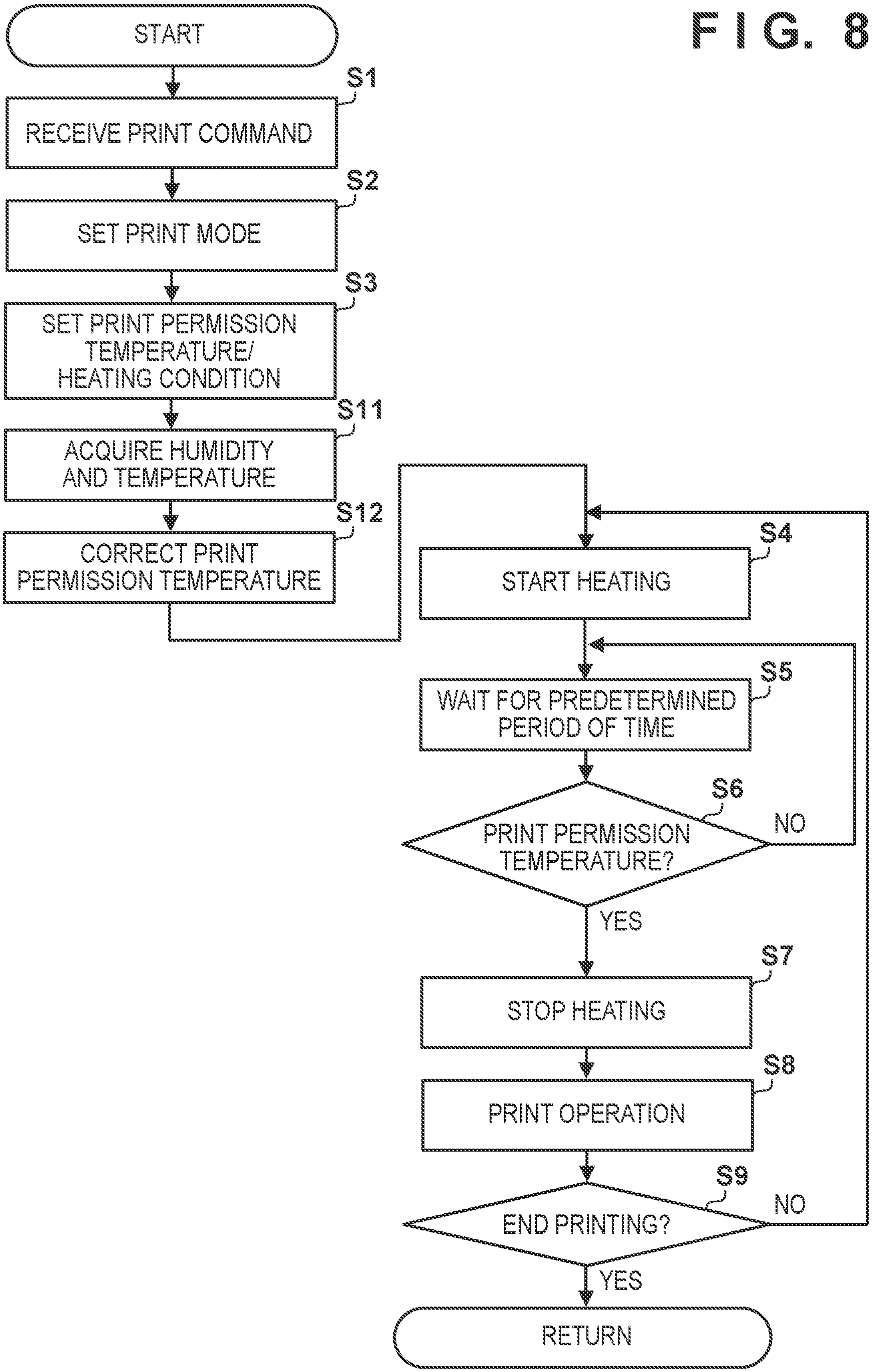
FIG. 8 is a flowchart illustrating an example of another control of the printing apparatus of FIG. 1A.

There are cases where the usage environment of the printing apparatus 1 has an effect on the temperature of the print head 9. In the present embodiment, the print permission temperature is corrected in accordance with information of the temperature and humidity around the printing apparatus 1. FIG. 8 is a flowchart illustrating an example of processing that the MPU 102 executes in place of FIG. 5. Among the respective steps of FIG. 8, the steps that are the same as the steps of FIG. 5 will be assigned the same reference numerals and description will be omitted.

After setting the print permission temperature/heating condition in step S3, a detection result of the temperature/humidity sensor 122 is acquired as humidity information and acquisition of peripheral temperature (acquisition of environmental temperature) of the printing apparatus 1 and acquisition of peripheral humidity (acquisition of environmental humidity) of the printing apparatus 1 are performed in step S11. In step S12, the print permission temperature that is set in step S3 is corrected based on the environmental temperature and environmental humidity that the information acquired in step S1*l* indicates. Here, effects that the environmental temperature and humidity have on ink discharge will be described.

The following two reasons can be conceived as a reason for deterioration in ink discharge. The first reason is that the temperature of the print head 9 is low (i.e., temperature of ink near the discharging port is low); accordingly, ink viscosity decreases and it becomes difficult for the ink to bubble. The second reason is that the moisture of the droplet near the discharging port evaporates; accordingly, ink viscosity increases locally and as a result of that, it becomes difficult for the ink to bubble. In other words, it is thought that the environmental temperature and humidity have an effect on the amount of decrease in the temperature of the print head 9 in one print scan and also have an effect on the minimum temperature that is necessary for discharge.

In order to correct these effects, regarding the first reason of a decrease in the temperature of the print head 9, it is possible to correct the amount of decrease in the temperature of the print head 9 in print scanning by considering a difference in the environmental temperature and the temperature of the print head 9. In short, since the amount of decrease in temperature is large in a case where the environmental temperature is low, it is necessary to set the print permission temperature high considering that amount. Regarding the second reason of moisture evaporation, it is possible to correct by considering the relationship of an amount of saturated water vapor and absolute humidity.

FIG. 9 illustrates an example of a correction value. The correction values of this figure can be stored in a storage device such as the control ROM 105, for example. In the example of FIG. 9, correction values are set for a combination of environmental temperature and environmental humidity. A tendency of the correction values regarding environmental temperature is that correction values are set so as to correct the print permission temperature to be higher as environmental temperature decreases. Regarding environmental humidity, correction values are set so as to correct the print permission temperature to be higher as environmental humidity decreases. For example, in a case where the environmental temperature is within a range of 5 to 15° C. and the environmental humidity is within a range of 0 to 30%, the print permission temperature is corrected to be 10° C. higher. For example, in a case where the environmental temperature is within a range of 25 to 35° C. and the environmental humidity is within a range of 30 to 60%, the print permission temperature is not corrected. Also, in a case where the environmental temperature is greater than 35° C. and the environmental humidity is greater than 60%, the print permission temperature is corrected to be 3° C. lower.

Accordingly, by setting the print permission temperature considering the environmental temperature and humidity in addition to a relative speed of the print head 9 and the print medium P, it is possible to accommodate to the usage environment of the printing apparatus 1 and increase throughput while performing ink discharge in a stable manner.

Note that an example in which the print permission temperature is corrected considering both the environmental temperature and the environmental humidity is described in the present embodiment; however, configuration may be such that the print permission temperature is corrected considering only the environmental temperature, and in such a case, detection of environmental humidity is unnecessary. Similarly, configuration may be such that the print permission temperature is corrected considering only the environmental humidity, and in such a case, detection of environmental temperature is unnecessary.

Third Embodiment

In the first embodiment, the print permission temperature of the print head 9 is different depending on the print mode; accordingly, if the print mode is different, the temperature of the print head 9 during printing will also be different. Accordingly, there are cases where the physical property of ink that is to be discharged from the print head 9 changes, and by this, there are cases where an ink discharge amount changes. As a result, there are cases where a color appearance is different depending on the print mode even if the same image is printed.

As a countermeasure to that, configuration may be taken so as to change a control parameter in a print operation of the print head 9 based on, for example, the print permission temperature. For example, configuration may be taken so as to change an ink discharge amount or discharge speed at the time of print scanning in accordance with the print permission temperature, and this can be achieved by modulating the length of a driving pulse of the print element 20 or the like. By such control of a discharge amount, it is possible to fix the color appearance even if the temperature of the print head 9 is different.

Also, assuming that the discharge amount becomes different due to a difference in the temperature of the print head 9, configuration may be taken so as to fix the color appearance by changing image processing parameters such as parameters for color processing and gamma processing.

Also, as another countermeasure, configuration may be taken so as to increase the print head 9 in temperature up to a predefined temperature that is common across all print modes and is different from the print permission temperature. The predefined temperature is a temperature that is the same or higher than the highest print permission temperature. For example, in the example of FIG. 6B, the print permission temperature of the temperature adjustment mode D is the highest (53° C.). Accordingly, the predefined temperature is set to 53° C., 55° C., or the like. The predefined temperature is a preset temperature that is common across all print modes.

Even in a case where the print head 9 has reached the print permission temperature, there are cases where print scanning cannot be started due to conveyance of the print medium P or processing of restoring performance of the print head 9. The print head 9 is increased in temperature to the predefined temperature using the waiting period for such other print start conditions to be met. It is possible to bring the temperature of the print head 9 at the time of print scanning close to uniformity regardless of the type of print mode. In a case where the print head 9 has reached the print permission temperature and other print start conditions have been met, print scanning is started even if the print head 9 has not reached the predefined temperature. By this, it is possible to shorten the waiting period for an increase in temperature. There may be cases where the print head 9 has reached the print permission temperature due to print scanning but not reached the predefined temperature. As a result of this, there may be slight color variation at the initial stage; however, it is possible to reduce the overall color variation by fixing the temperature that the print head 9 reaches in the end.

Figure 10:
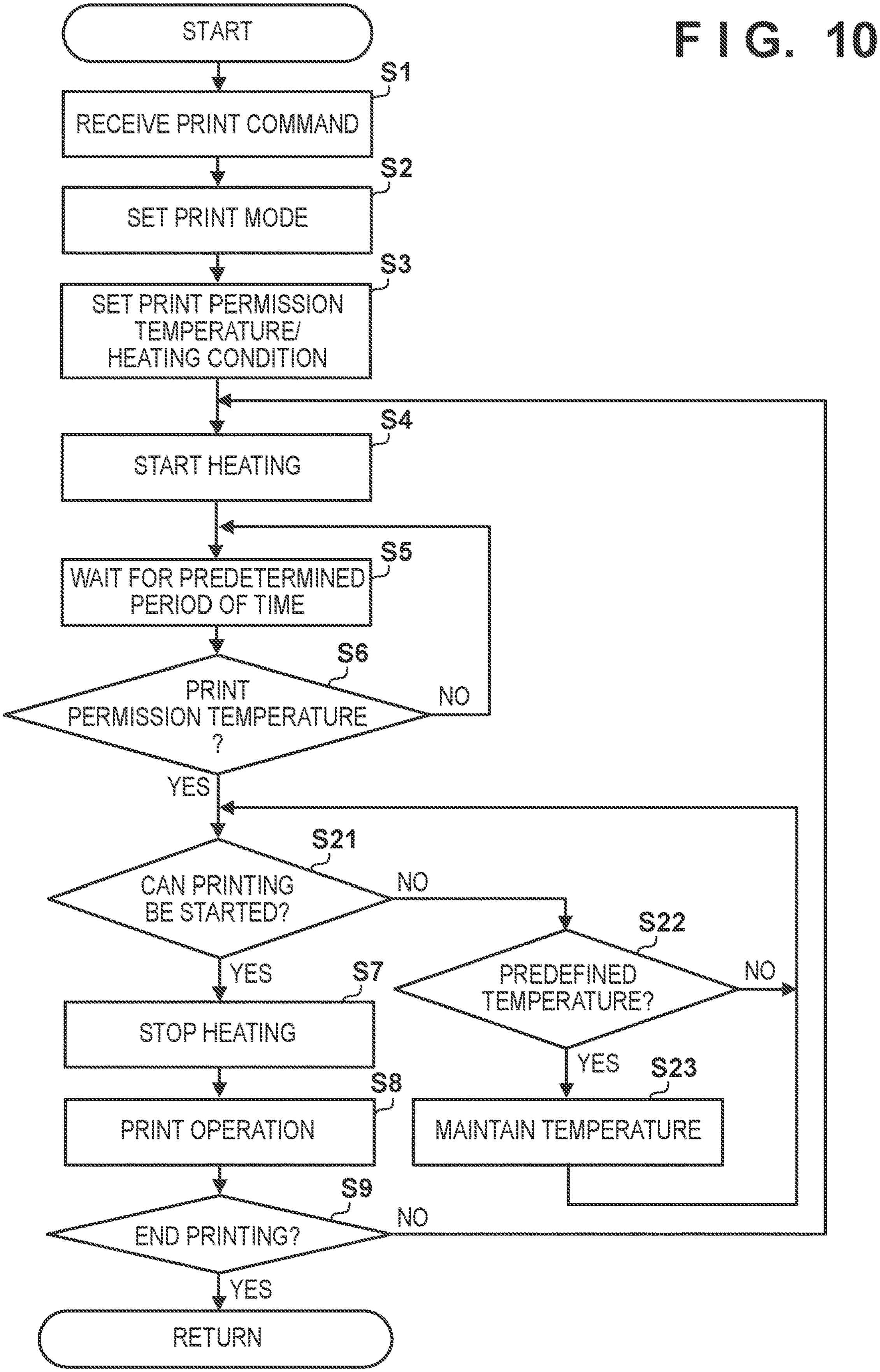
FIG. 10 is a flowchart illustrating an example of another control of the printing apparatus of FIG. 1A.

FIG. 10 is a flowchart illustrating an example of control for causing the print head 9 to increase in temperature to the predefined temperature and is a flowchart illustrating an example of processing that the MPU 102 executes in place of FIG. 5. Among the respective steps of FIG. 10, the steps that are the same as the steps of FIG. 5 will be assigned the same reference numerals and description will be omitted.

After it is determined in step S6 that the print head 9 has reached the print permission temperature that is set in step S3, heating of the print head 9 is not immediately stopped and it is determined in step S21 whether or not print scanning can be started. Here, it is determined whether other print start conditions such as conveyance of the print medium P have been met, for example. In a case where it is determined in step S21 that print scanning can be started, heating of the print head 9 is stopped in step S7 and print scanning is started in step S8.

In a case where it is determined in step S21 that print scanning cannot be started, it is determined in step S22 whether or not the print head 9 has reached the predefined temperature. This determination is performed based on the detection results of the sensors SR similarly to the determination in step S6. In a case where the print head 9 has not reached the predefined temperature, the processing returns to step S21. In such a case, heating of the print head 9 is continued. In a case where the print head 9 has reached the predefined temperature, the processing advances to step S23. In step S23, control for maintaining the temperature of the print head 9 is performed. For example, the print head 9 is prevented from increasing in temperature beyond the predefined temperature by performing control such as stopping heating or lowering heating.

By such control, it is possible to bring the temperature of the print head 9 across different print modes close to uniformity. In a case where print data density is high, it is predicted that driving frequency for the print element 20 in print scanning is high and that the temperature of the print head 9 will be higher than in the early stages of printing. At the time of the early stages of printing, the temperature of the print head 9 is different depending on the type of print mode; however, it is possible to prevent occurrence of waiting periods while reducing a difference in the temperatures of the print head 9 across print modes.

Fourth Embodiment

Figure 11A:
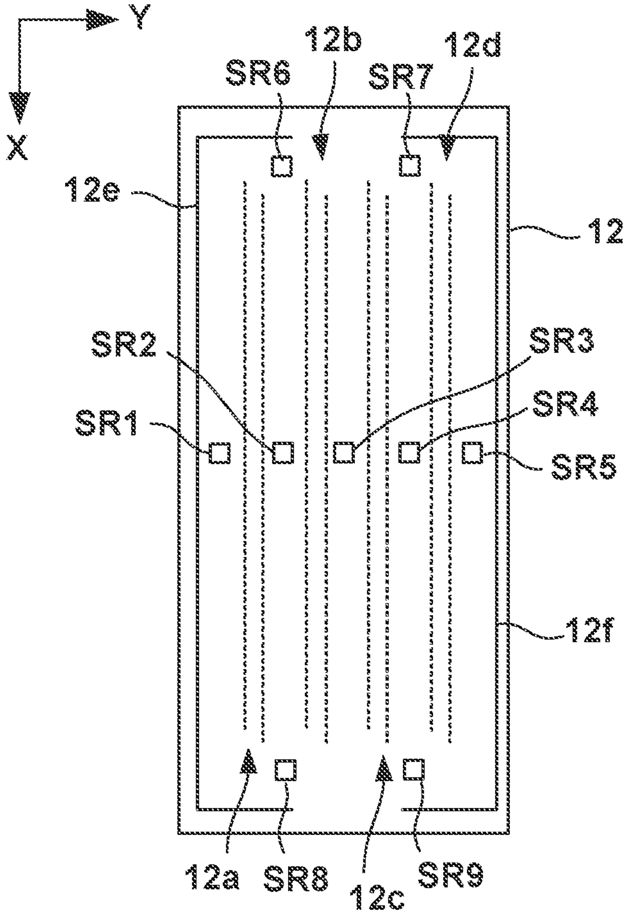
FIG. 11A is a magnified view illustrating another example of the discharge element substrate.

In first to third embodiments, temperature control of the print head 9 is performed using the print element 20 as a heating element; however, a heating element that is dedicated to temperature adjustment and is not used for ink discharge may be arranged. FIG. 11A is a magnified view of the discharge element substrate 12 that illustrates an example of that. In the example of FIG. 11A, configurations that are the same as the example of FIG. 3A will be assigned the same reference numerals and description will be omitted.

The discharge element substrate 12 of the present embodiment comprises warming heaters 12*e* and 12*f* as heating elements. The warming heaters 12*e* and 12*f* are metal wiring that generate heat by supplying power. The warming heaters 12*e* and 12*f* are formed so as to surround the discharge element substrate 12.

Note that the arrangement of the warming heaters 12*e* and 12*f* is not limited to the illustrated example and various layouts such as wiring along a column of nozzles can be employed. Also, a warming heater may be a heating member that is arranged within an ink channel.

It also becomes possible to perform temperature control of the print head 9 during print scanning by arranging the warming heaters 12*e* and 12*f* separately from the print element 20 as in the present embodiment. Also, it is possible to use a print element that applies ink without requiring thermal energy such as a piezo-type print element as a print element in a configuration in which a dedicated warming heater is arranged such as the present embodiment.

Also, although a form in which the temperature of the print head 9 is detected by a sensor arranged on the discharge element substrate 12 has been described, limitation is not made to this. For example, a form may also acquire the temperature of ink near a discharge port that is detected by a sensor arranged in the ink.

Fifth Embodiment

In the first to fourth embodiments, temperature control and print permission temperature arrival confirmation of the print head 9 is performed for each print scan; however, no limitation is made to this, and configuration may be taken so as to perform for each plurality of times of print scanning, each page, each predetermined period of time, or each print job. However, in a form in which temperature control and print permission temperature arrival confirmation of the print head 9 is performed for each print scan, it is possible to reduce temperature fluctuation of the print head 9.

Sixth Embodiment

Figure 11B:
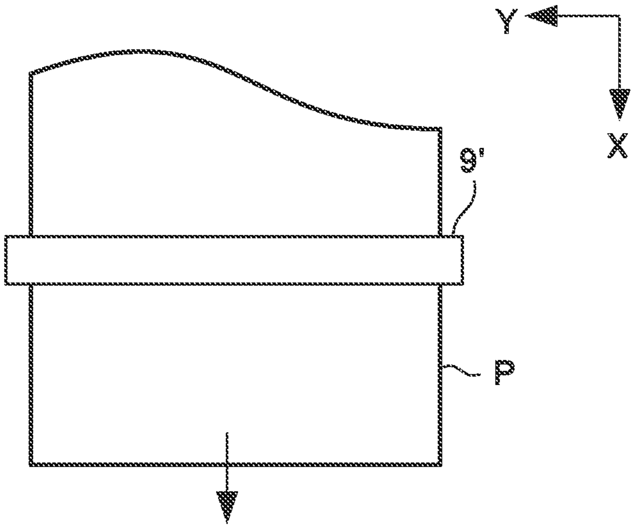
FIG. 11B is a view illustrating another example of the print head.

In first to fifth embodiments, a serial-type inkjet printing apparatus is exemplified; however, the present invention can also be applied to a full-line head inkjet printing apparatus. FIG. 11B is a schematic diagram illustrating that example and is a view of a print head 9' seen from above similarly to FIG. 2A.

The print head 9' is arranged to extend in the Y direction and is a full-line head whose position is fixed, and nozzles are arranged in a range that covers the width of the image print region of the print medium P of the maximum usable size. In a print operation, an image is printed by discharging, onto the print medium P, ink from the print head 9' while continuously conveying the print medium P in the X direction, for example.

Temperature control and print permission temperature arrival confirmation of the print head 9' can be performed, for example, between pages or print jobs. In such a case, the print permission temperature is set based on a relative speed of the print head 9' and the print medium P and the relative speed is a conveyance speed of the print medium P. In a print mode whose conveyance speed of the print medium P is fast, a period of time for a print operation per page unit or print job unit becomes short; accordingly, the print permission temperature is set to be relatively low. Conversely, in a print mode whose conveyance speed of the print medium P is slow, a period of time for a print operation per page unit or print job unit becomes long; accordingly, the print permission temperature is set to be relatively high.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-108999, filed Jun. 24, 2020, which is hereby incorporated by reference herein in its entirety.

What is claimed is:

1. A printing apparatus comprising:

a printing unit configured to print an image on a print medium by application of a printing material during relative scanning of the print medium;

an acquiring unit configured to acquire temperature information of the printing unit; and a control unit configured to control the printing unit so as to start relative scanning in a case where a temperature that is indicated by the acquired temperature information has reached a print permission temperature, wherein the print permission temperature in a first print mode in which a speed at a time of a constant speed in relative scanning is a first speed is a first temperature, and the print permission temperature in a second print mode in which the speed at the time of the constant speed is a second speed that is faster than the first speed is a second temperature that is lower than the first temperature.

2. The printing apparatus according to claim 1, wherein the first print mode and the second print mode are print modes for printing an image on the same type of print medium.

3. The printing apparatus according to claim 1, further comprising a carriage on which the printing unit is mounted and configured to move, wherein the relative scanning is executed by movement of the carriage.

4. The printing apparatus according to claim 1, further comprising a conveyance unit configured to convey the print medium in a conveyance direction, wherein the printing unit includes a full-line head in which a plurality of print elements are arranged in a direction that intersects the conveyance direction, and the relative scanning is executed by conveyance of the print medium.

5. The printing apparatus according to claim 1, further comprising a temperature control unit configured to control a temperature of the printing unit by heating the printing unit, wherein in a case where the temperature information that is acquired by the acquiring unit indicates a temperature that is lower than the print permission temperature, the temperature control unit heats the printing unit until the print permission temperature is reached.

6. The printing apparatus according to claim 5, wherein the temperature control unit heats the printing unit by driving a heating element that is arranged in the printing unit.

7. The printing apparatus according to claim 6, wherein a plurality of heating elements are arranged in a first direction in the printing unit, and the printing unit moves in a second direction that intersects the first direction in relative scanning.

8. The printing apparatus according to claim 6, wherein the heating element is a print element that discharges ink as the printing material.

9. The printing apparatus according to claim 5, wherein the temperature control unit causes the printing unit to increase in temperature toward the print permission temperature during print standby of the printing unit.

10. The printing apparatus according to claim 5, wherein the temperature control unit causes a temperature of the printing unit to increase up to a predetermined temperature, and the predetermined temperature is a temperature that is the same or higher than the highest print permission temperature.

11. The printing apparatus according to claim 1, further comprising:

a peripheral temperature acquisition unit configured to acquire a temperature around the printing apparatus; and a setting unit configured to set the print permission temperature based on temperature information that is acquired by the peripheral temperature acquisition unit.

12. The printing apparatus according to claim 11, wherein in a case where the temperature information that is acquired by the peripheral temperature acquisition unit indicates a first temperature, the setting unit does not change the print permission temperature, and in a case where a second temperature that is lower than the first temperature is indicated, the setting unit corrects the print permission temperature to a high temperature side.

13. The printing apparatus according to claim 11, wherein the print permission temperature is a higher temperature than the temperature around the printing apparatus.

14. The printing apparatus according to claim 1, further comprising:

a peripheral humidity acquisition unit configured to acquire a humidity around the printing apparatus; and a setting unit configured to set the print permission temperature based on humidity information that is acquired by the peripheral humidity acquisition unit.

15. The printing apparatus according to claim 14, wherein in a case where the humidity information acquired by the peripheral humidity acquisition unit indicates a first humidity, the setting unit does not change the print permission temperature, and in a case where a second humidity that is lower than the first humidity is indicated, the setting unit corrects the print permission temperature to a high temperature side.

16. The printing apparatus according to claim 1, wherein the control unit changes a control parameter in the print operation of the printing unit based on the print permission temperature.

17. The printing apparatus according to claim 1, wherein the acquiring unit acquires, as the temperature information, a temperature detected by a detection unit that is arranged in the printing unit.

18. A control method of a printing apparatus which includes a printing unit configured to print an image on a print medium by application of a printing material during relative scanning of the print medium, and an acquiring unit configured to acquire temperature information of the printing unit, the method comprising:

controlling the printing unit so as to start relative scanning in a case where a temperature that is indicated by the acquired temperature information has reached a print permission temperature, wherein the print permission temperature in a first print mode in which a speed at a time of a constant speed in relative scanning is a first speed is a first temperature, and the print permission temperature in a second print mode in which the speed at the time of the constant speed is a second speed that is faster than the first speed is a second temperature that is lower than the first temperature.

19. A non-transitory computer-readable storage medium operable to store a program that causes a computer to execute a control method of a printing apparatus including a printing unit configured to apply a printing material onto a print medium, and an acquiring unit configured to acquire temperature information of the printing unit, the method comprising:

controlling the printing unit so as to start relative scanning in a case where a temperature that is indicated by the acquired temperature information has reached a print permission temperature, wherein the print permission temperature in a first print mode in which a speed at a time of a constant speed in relative scanning is a first speed is a first temperature, and the print permission temperature in a second print mode in which the speed at the time of the constant speed is a second speed that is faster than the first speed is a second temperature that is lower than the first temperature.

* * * * *